(12) United States Patent
Ho

(10) Patent No.: US 10,377,402 B2
(45) Date of Patent: Aug. 13, 2019

(54) DISC GOLF BAG CART

(71) Applicant: Dongguan Sunforce Plastics Appliances Co., Ltd., Dongguan (CN)

(72) Inventor: Siu Fung Ho, Dongguan (CN)

(*) Notice: Subject to any disclaimer, the term of this patent is extended or adjusted under 35 U.S.C. 154(b) by 0 days.

(21) Appl. No.: 16/006,539

(22) Filed: Jun. 12, 2018

(65) Prior Publication Data

US 2018/0354537 A1 Dec. 13, 2018

(30) Foreign Application Priority Data

Jun. 12, 2017 (CN) ...................... 2017 2 0677336 U

(51) Int. Cl.
*B62B 3/04* (2006.01)
*B62B 3/12* (2006.01)
*B62B 3/02* (2006.01)
*B62B 3/10* (2006.01)

(52) U.S. Cl.
CPC ................. *B62B 3/04* (2013.01); *B62B 3/02* (2013.01); *B62B 3/10* (2013.01); *B62B 3/12* (2013.01); *B62B 2202/404* (2013.01)

(58) Field of Classification Search
CPC ....................................................... B62B 3/04
See application file for complete search history.

(56) References Cited

U.S. PATENT DOCUMENTS

| | | | | |
|---|---|---|---|---|
| 7,287,765 B2 * | 10/2007 | Murphy | ................. | A63B 55/00 280/47.26 |
| 2005/0040616 A1 * | 2/2005 | Cheng | ...................... | B62B 3/02 280/47.24 |

* cited by examiner

*Primary Examiner* — James A Shriver, II
*Assistant Examiner* — James J Triggs
(74) *Attorney, Agent, or Firm* — Tsz Lung Yeung

(57) ABSTRACT

A disc golf bag cart which includes a front wheel, two rear wheels, and a cart frame. The front wheel and the rear wheel are provided at the bottom portion of the cart frame. The top portion of the cart frame includes an upper rotatable bag stabilizer, the middle portion of the cart frame includes a middle bag stabilizer, and the bottom portion of the cart frame includes a lower tightenable bag stabilizer. The disc golf bag carrying the disc golf can be secured onto the cart through the mechanisms of the upper rotatable bag stabilizer, the middle bag stabilizer, and the lower tightenable bag stabilizer. Comparing to conventional trolley cart, the disc golf bag cart of the present invention is capable of fitting disc golf bags with different shapes and sizes.

3 Claims, 5 Drawing Sheets

DISC GOLF BAG CART

BACKGROUND OF THE PRESENT INVENTION

Field of Invention

The present invention relates to a machine of trolley cart, and more particularly to trolley cart for carrying disc golf bag.

Description of Related Arts

Disc golf is a very popular sports in developed countries. The rules of disc golf are similar to those of the traditional golf sport where a player will try to reach the goal by throwing a disc golf. The least amount of attempt, the better is the scores. During the game, the player needs to carry a backpack which carries typically 20 to 30 disc golf and travels for several miles in the woods or slopes, which is very inconvenience. Thus, it is necessary to develop a carrier for carrying the disc golf equipment.

SUMMARY OF THE PRESENT INVENTION

In order to solve the above problems in which it is very difficult for the player to transport the disc golf, an object of the present invention is to provide a trolley cart for carrying disc golf bag which is simple in structure and can be adjusted to carry disc golf bag with different sizes in width or length.

According to the present invention, the foregoing and other objects and advantages are attained by the followings:

A trolley cart for disc golf bag cart for disc golf bag which comprises: a front wheel, a rear wheel and a frame. The cart frame is divided into a top portion, a middle portion, and a bottom portion. The front wheel and the rear wheel are provided at the bottom portion of the cart frame. The cart frame comprises an upper rotatable bag stabilizer provided at the top portion, a middle bag stabilizer provided at the middle portion and a lower tightenable bag stabilizer provided at the bottom portion. The top part of the disc golf bag is attached to the top portion of the cart frame by the upper rotatable bag stabilizer. The middle of the disc golf bag is attached to the middle portion of the cart frame by the middle bag stabilizer. The bottom of the disc golf bag is attached to the bottom portion of the cart frame by the lower bag pulling stabilizer.

Preferably, the upper rotatable bag stabilizer comprises an upper bag mounting base, an upper bag rotating arm, a quick release handle, a handle pad, a quick release adjusting rod, and nut. The upper bag mounting base is fixedly provided on the top portion of the cart frame and two upper bag rotating arms are rotatably installed on the left and right end of the rear side of the upper bag mounting base respectively. The thread portion at the bottom end of the quick release adjusting rod passes through the upper bag mounting base and the upper bag rotating arm to connect with the nuts. The top end of the quick release adjusting rod passes through the handle pad and hingedly couples with the quick release handle. By adjusting the quick release handles, the user may adjust the position of the upper bag rotating arms for different disc golf bag sizes.

Preferably, the lower tightenable bag stabilizer comprises a lower bag mounting base, a lower bag arm, a nylon belt, and a hook. The lower bag mounting base is fixedly provided on the bottom portion of the cart frame and two lower bag arms are rotatably installed on the left and right end of the front side of the lower bag mounting base respectively. One end of the nylon belt is attached to the lower bag arm and another end of the nylon belt is attached to the hook for hooking onto the disc golf bag.

Preferably, the middle bag stabilizer is a metal hook which hooks onto the middle part of the disc golf bag for preventing the disc golf bag from swinging when the cart is moving.

Preferably, the length of the nylon belt is adjustable in length and its pulling force and connects to the hook.

Preferably, the cart frame is foldable.

Advantageous effect of the present invention: according to the present invention, the disc golf bag can be securely attached to the cart frame by the upper rotatable bag stabilizer, the middle bag stabilizer, and the lower tightenable bag stabilizer. The cart of the present invention can secure the disc golf bag of different length and width fittingly and tightly while the cart is moving. Therefore, the disc golf players will not need to carry the disc golf bag on their own.

DETAILED DESCRIPTION OF THE PREFERRED EMBODIMENT

Figure 1:
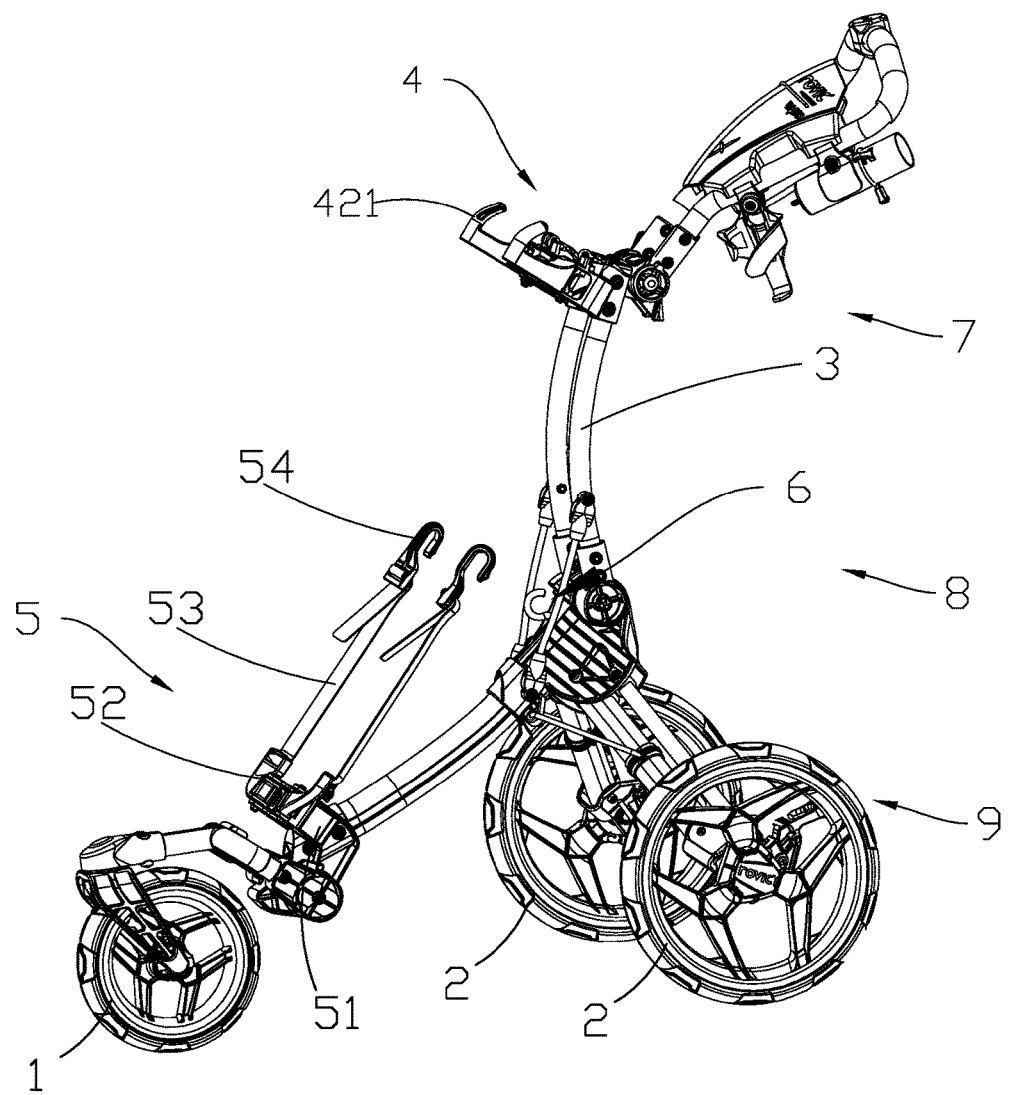
FIG. 1 is a perspective view of a disc golf bag cart according to the preferred embodiment of the present invention.

According to the below description of the present invention, terms which describe the relative placement or direction of the elements such as "center", "top", "bottom", "left", "right", "perpendicular", "horizontal", "inside", or "outside" are based on the direction and relationship as shown in the figures and are not intended to be limiting.

Unless it is specifically defined below, terms such as "provided", "installed", "connected", "attached" should be interpreted in a general broad sense. For example, "connected" is interpreted as fixedly connected, detachably connected, integrally connected, mechanically connected, electrically connected, directly connected, indirectly connected through another medium or internal connection of two elements. The interpretation is well understood the person skilled in the art.

The preferred embodiment of the present invention is further described as follows. One skilled in the art will understand that the embodiment of the present invention as shown in the drawings and described is exemplary only and not intended to be limiting.

The present invention discloses a trolley cart for disc golf. The trolley cart is designed for disc golf player for carrying the disc golf bag. According to FIG. 1 of the drawings, the trolley cart comprises a front wheel 1, two rear wheels 2, a cart frame 3. The cart frame 3 has a top portion 7, a middle portion 8, and a bottom portion 9. The front wheel 1 and the rear wheels 2 are rotatably connected at the bottom portion 9 of the cart frame 3. The cart frame 3 is tetrahedral in shape. The cart frame 3 comprises an upper rotatable bag stabilizer 4 provided at the top portion 7, a middle bag stabilizer 6 provided at the middle portion 8 and a lower tightenable bag stabilizer 5 provided at the bottom portion 9. The top part of the disc golf bag is attached to the top portion 7 of the cart frame 3 by the upper rotatable bag stabilizer 4. The middle of the disc golf bag is attached to the middle portion 8 of the cart frame 3 by the middle bag stabilizer 6. The bottom of the disc golf bag is attached to the bottom portion 9 of the cart frame 3 by the lower tightenable bag stabilizer 5. The disc golf bag can be securely attached to the cart frame 3 by the upper rotatable bag stabilizer 4, the middle bag stabilizer 6, and the lower tightenable bag stabilizer 5.

Figure 2:
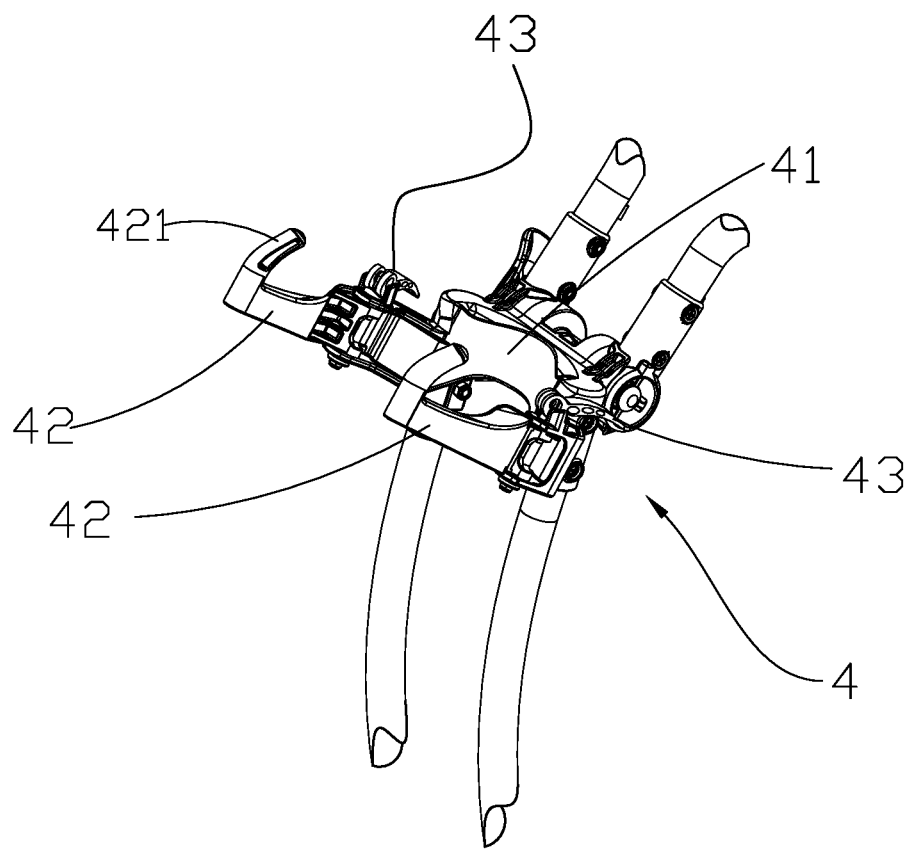
FIG. 2 is a perspective view of an upper rotatable bag stabilizer of the disc golf bag cart according to the above preferred embodiment of the present invention.
Figure 3:
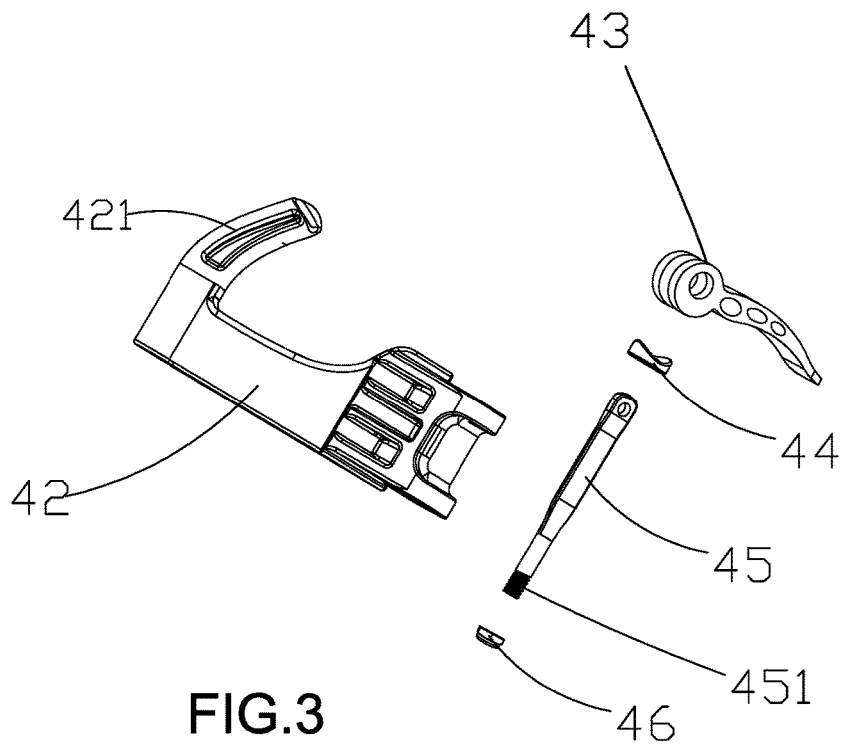
FIG. 3 is an exploded perspective view of the upper rotatable bag stabilizer according to the above preferred embodiment of the present invention.
Figure 4:
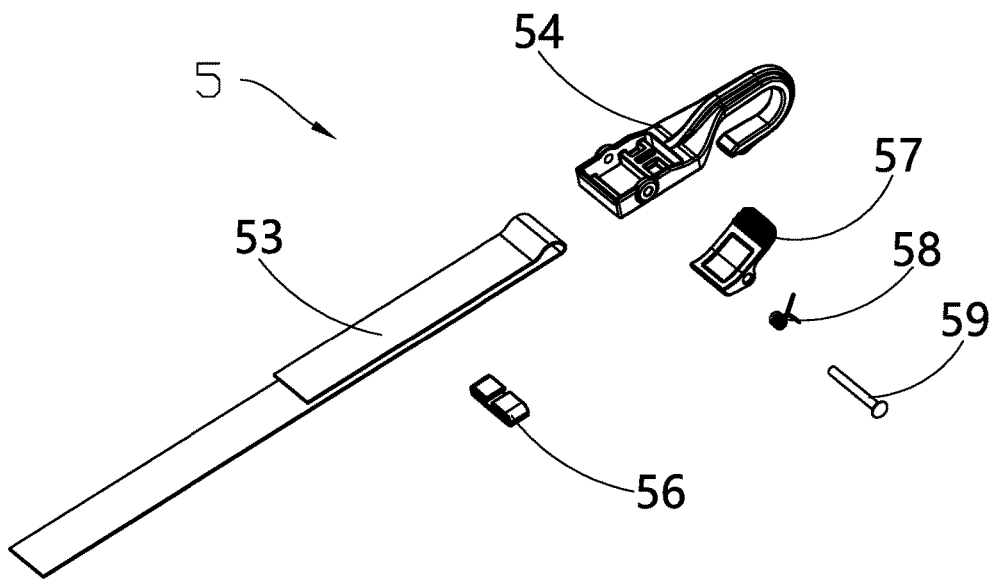
FIG. 4 is an exploded perspective view of the lower tightenable bag stabilizer according to the above preferred embodiment of the present invention.

According to FIG. 2-4 of the drawings, the upper rotatable bag stabilizer 4 comprises an upper bag mounting base 41, an upper bag rotating arm 42, a quick release handle 43, a handle pad 44, a quick release adjusting rod 45, and nut 46. One upper bag mounting base 41 is fixedly provided on the top portion 7 of the cart frame 3 and there are two upper bag rotating arms 42, two quick release handles 43, two handle pads 44, two quick release adjusting rods 45, and two nuts 46. The two upper bag rotating arms 42 are rotatably installed on the left and right end of the rear side of the upper bag mounting base 41 respectively. The bottom end of the quick release adjusting rod 45 passes through the upper bag mounting base 41 and the upper bag rotating arm 42 to connect with the nuts 46 through the thread portion 451 at the bottom end such that the quick release adjusting rod 45 can be secured in place. The top end of the quick release adjusting rod 45 passes through the handle pad 44 and hingedly couples with the quick release handle 43. A hard plastic material is preferably selected for the handle pad 44 for rotating and turning the quick release handle 43. The quick release handle 43 has a bumpy contour on the outer surface such that when the quick release handle 43 engages with the handle pad 44, it may cause the handle pad 44 to release upwardly or press downwardly against the upper bag rotating arm 42. When the handle pad 44 is released upwardly, the upper bag rotating arm 42 may rotate freely. When the handle pad 44 is pressed downwardly, the upper bag rotating arm 42 is locked and may not rotate. In a locking position, the two upper bag rotating arms 42 provide a fixed distance between the rotating arms 42 such that the hooking portion 421 of the upper bag rotating arms 42 may couple with the top side of the disc golf bag. Preferably, the hooking portion 421 has a curved hook shaped, which is shown in FIGS. 1-3 of the drawings. By adjusting the quick release handles 43, the user may adjust the position of the upper bag rotating arms 42 to customize arm distance for different disc golf bag sizes.

According to FIG. 1 and FIG. 4 of the drawings, the lower tightenable bag stabilizer 5 comprises a lower bag mounting base 51, a lower bag arm 52, a nylon belt 53, a hook 54, a nylon belt strap holder 56, a pressing plate 57, a torsion spring 58 and a shaft 59. One lower bag mounting base 51 is fixedly provided on the bottom portion 9 of the cart frame 3 and there are two lower bag arms 52, two nylon belts 53, and two hooks 54. The two lower bag arms 52 are affixed on the left and right end of the front side of the lower bag mounting base 51 respectively. One end of the nylon belt 53 is connected to the lower bag arm 52 and another end of the nylon belt 53 is connected to the hook 54. The hook 54 is arranged to hook on to the disc golf bag. The nylon belt 53 has a predetermined level of elasticity, pulls down on the disc golf bag to tighten the bottom of the disc golf bag by the hook 54, the pressing plate 57, and the torsion spring 58. The pressing plate 57 and the torsion spring 58 provide a pulling force such that the nylon belt 53 can pull on tightly the disc golf bag with different lengths. The nylon belt 53 can be connected the hook 54 in which a length adjustment arrangement is provided.

Figure 5:
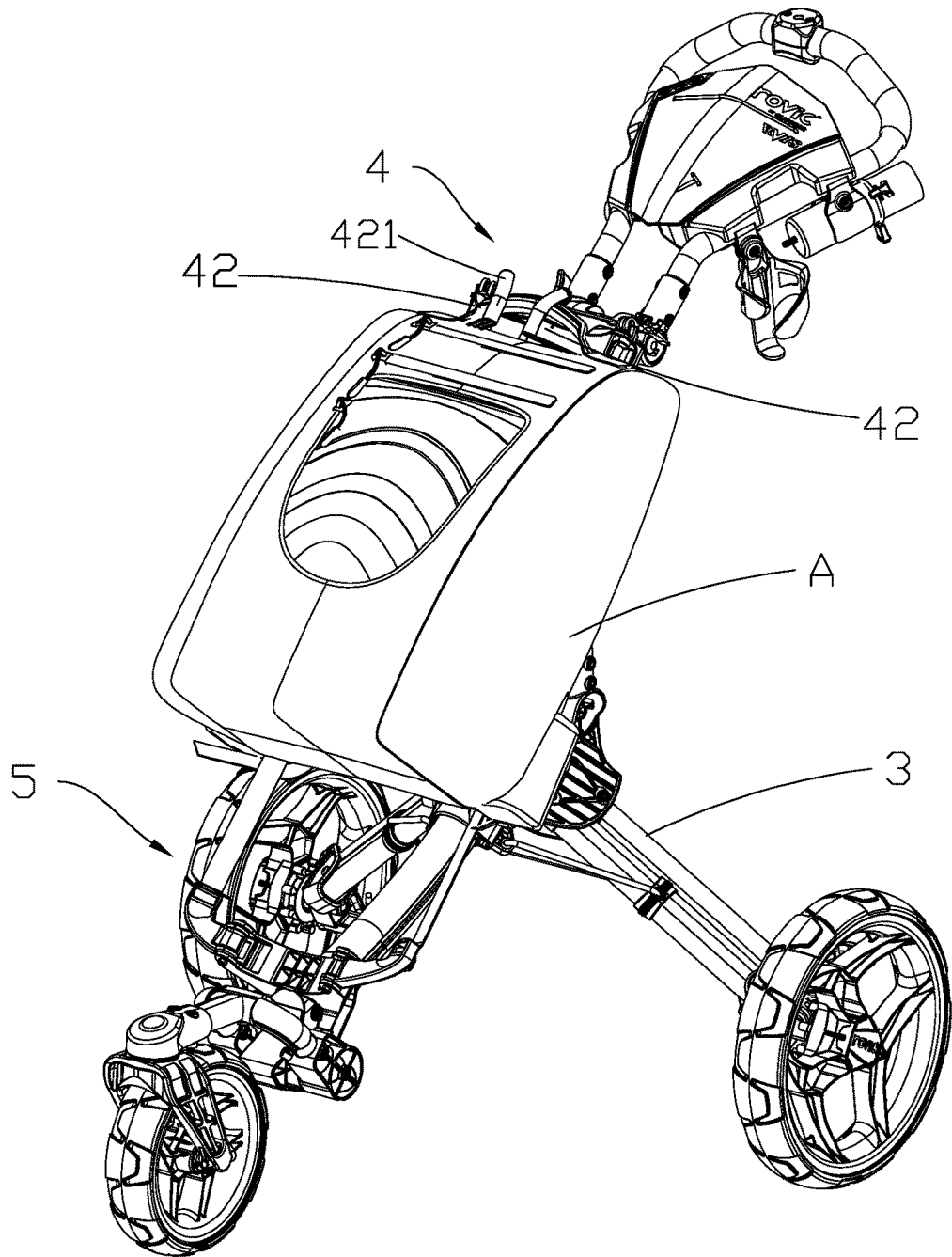
FIG. 5 is a perspective view of the disc golf bag cart, illustrating a disc golf bag being secured onto the disc golf bag cart when the disc golf bag cart is in an open position.
Figure 6:
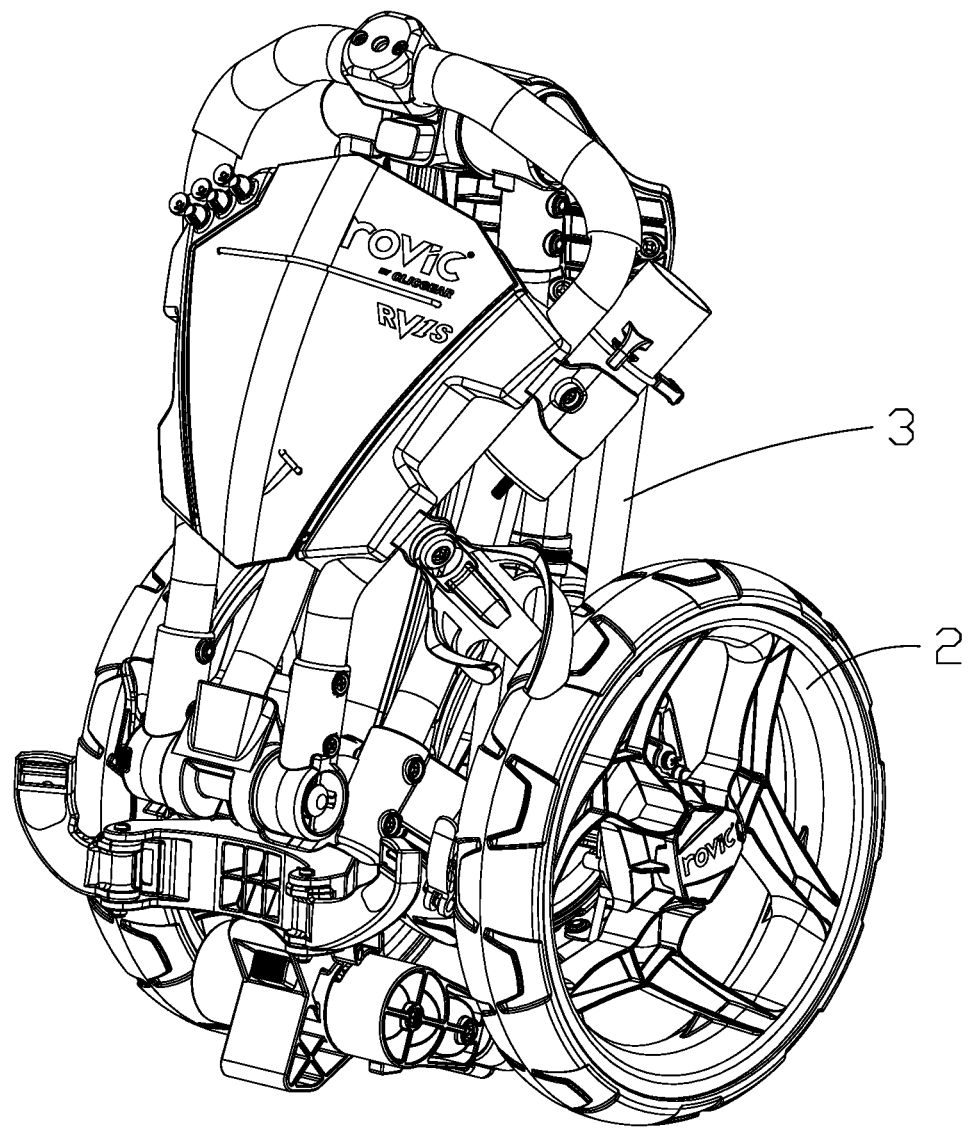
FIG. 6 is a perspective view of the disc golf bag cart, illustrating a folded position according to the preferred embodiment of the present invention.

According to the present invention, the middle bag stabilizer 6 can be a metal hook which hooks onto the middle part of the disc golf bag such that the middle part of the disc golf bag is held tightly near the middle portion 8 of the cart frame 3, thus preventing the disc golf bag from swinging left and right when the trolley cart is travelling. According to FIG. 5 of the drawings, a disc golf bag A is securely attached on the cart frame 3. According to FIG. 6 of the drawings, the cart frame 3 has a foldable construction.

According to the above disclosure, the present invention provides the trolley cart for carrying disc golf bag which can solves the conventional problem for carrying the disc golf bag with different sizes. It is easy to use and simple in mechanical structure.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A disc golf bag cart arranged for securing a disc golf bag, comprising a cart frame having a top portion, a middle portion and a bottom portion respectively, a front wheel and two rear wheels rotatably connected to a bottom portion of said cart frame, wherein said trolley cart for disc golf bag comprises:

an upper rotatable bag stabilizer provided at said top portion of said cart frame, arranged for securing a top part of the disc golf bag;

a middle bag stabilizer provided at said middle portion of said cart frame, arranged for securing a middle of the disc golf bag; and a lower tightenable bag stabilizer provided at said bottom portion of said cart frame, arranged for securing a bottom of the disc golf bag, thereby the disc golf bag is secured into position on said cart frame through said upper rotatable bag stabilizer, said middle bag stabilizer and said lower tightenable bag stabilizer, wherein said upper rotatable bag stabilizer comprises an upper bag mounting base and a pair of rotatable arm arrangements each said rotatable arm arrangement comprises an upper bag rotating arm, a quick release handle, a handle pad, a quick release adjusting rod and a nut, wherein said upper bag mounting base is fixedly connected to said top portion of said cart frame, said upper bag rotating arms of said pair of rotatable arm arrangements are rotatably connected to said upper bag mount base at two side ends of a rear side of said upper bag mounting base respectively, one said quick release adjusting rod has top end and a bottom end of which said bottom end penetrates through said upper bag mounting base at one of said two side ends and one said upper bag rotating arm and connecting to one said nut through a thread portion at said bottom end such that said quick release adjusting rod is affixed into position, and a top end passes through said handle pad and connects to said quick release handle such that a position of said upper bag rotating arm is adjustable by rotating said upper bag rotating arm when said handle pad is released and then said upper bag rotating arm is locked into position when said handle pad is pressed downwardly against said upper rotating arm, thereby a distance between said two upper bag rotating arms is capable of adjustment for fitting disc golf bags of different width.

2. A disc golf bag cart arranged for securing a disc golf bag, comprising a cart frame having a top portion, a middle portion and a bottom portion respectively, a front wheel and two rear wheels rotatably connected to a bottom portion of said cart frame, wherein said trolley cart for disc golf bag comprises:

an upper rotatable bag stabilizer provided at said top portion of said cart frame, arranged for securing a top part of the disc golf bag;

a middle bag stabilizer provided at said middle portion of said cart frame, arranged for securing a middle of the disc golf bag; and a lower tightenable bag stabilizer provided at said bottom portion of said cart frame, arranged for securing a bottom of the disc golf bag, thereby the disc golf bag is secured into position on said cart frame through said upper rotatable bag stabilizer, said middle bag stabilizer and said lower tightenable bag stabilizer, said lower tightenable bag stabilizer comprises a lower bag mounting base and a pair of lower bag arm arrangement, each said lower bag arm arrangement comprises a lower bag arm, a nylon belt, a hook, a nylon belt strap holder, a pressing plate, a torsion spring and a shaft, said lower bag mounting base is affixed to said bottom portion of said cart frame, said pair of lower bag arms are affixed on a left end and a right end of said front side of said lower bag mounting base respectively, said nylon belt has one end connected to said lower bag arm and another end connected to said hook, said hook is arranged to hook onto the disc golf bag.

3. The disc golf bag cart according to claim 2, wherein said pressing plate provides a pressing force through said torsion spring so as to achieve a locking condition along a forward pulling direction and a great resistance along a backward pulling direction, hence a tightness of said nylon belt is adjustable.

* * * * *